United States Patent [19]

Takami et al.

[11] Patent Number: 4,780,533
[45] Date of Patent: Oct. 25, 1988

[54] DISAZO PIGMENTS HAVING IMPROVED HEAT RESISTANCE USING LOWER ALKYL AND PHENYL ESTERS OF ACETOACETANILIDE

[75] Inventors: Naonori Takami; Tetsuo Fukuda; Takeshi Uehara, all of Iwata, Japan

[73] Assignee: Dainichiseika Color & Chemicals Mfg. Co., Ltd., Tokyo, Japan

[21] Appl. No.: 12,377

[22] Filed: Feb. 9, 1987

[30] Foreign Application Priority Data

Feb. 14, 1986 [JP] Japan .................. 61-028917

[51] Int. Cl.$^4$ ............... C09B 35/08; C09B 41/00; C09D 11/08
[52] U.S. Cl. ................... 534/747; 106/23; 106/496; 534/753; 534/739; 534/740; 534/741; 534/742; 534/746; 534/887; 534/582; 8/509; 8/521
[58] Field of Search ............ 534/746, 747, 739, 740, 534/741; 106/588 Q

[56] References Cited

U.S. PATENT DOCUMENTS 4,341,701 7/1982 Pechby et al. .................. 534/739
4,648,907 3/1987 Hays et al. ..................... 534/747

Primary Examiner—Floyd D. Higel
Attorney, Agent, or Firm—Oblon, Fisher, Spivak, McClelland & Maier

[57] ABSTRACT

A disazo pigment is prepared by coupling the tetrazo compound of 3,3'-dichlorobenzidine with an acetoacetanilide compound which is other than those represented by the below-described general formula (I) and is free of water-soluble groups. In the present invention, about 0.5–50 mole % of the acetoacetanilide compound is replaced by a compound represented by the following general formula (I):

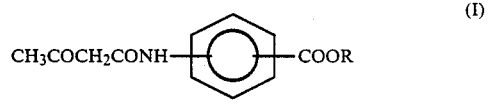

(I)

wherein R means a methyl, ethyl, propyl or butyl group or a substituted or unsubstituted phenyl group.

16 Claims, No Drawings

DISAZO PIGMENTS HAVING IMPROVED HEAT RESISTANCE USING LOWER ALKYL AND PHENYL ESTERS OF ACETOACETANILIDE

BACKGROUND OF THE INVENTION (1) Field of the Invention

This invention relates to a process for the preparation of a disazo pigment useful for various applications, especially, for coloring polyvinyl chloride resins.

(2) Description of the Prior Art

Disazo pigments obtained from 3,3'-dichlorobenzidine and various acetoacetanilide compounds, which do not contain any water-soluble groups, have been used widely for the coloration of polyvinyl chloride resins, printing inks, paints and rubber. Their use, however, is accompanied by a drawback that when they are employed for example to color a polyvinyl chloride resin, the color of the resulting polyvinyl chloride resin varies depending on the heating and kneading conditions for the polyvinyl chloride resin even if the same azo pigment is used. The cause of the drawback has been found to reside in the heating and kneading conditions.

Accordingly, the above-mentioned drawback might be solved if exactly the same temperature conditions were employed upon heating and kneading. As a matter or fact, it is however almost impossible to make temperature conditions constant. Variations of about 5°–10° C. in processing temperature are unavoidable in general. When a conventional disazo pigment is employed as a colorant, the colored product unavoidably develops a color difference even if a disazo pigment prepared in the same lot is used. When the above disazo compounds are used in printing inks, they are accompanied by a drawback that the disazo pigments lose their coloring power due to their heating upon flushing. With a view toward minimizing such drawbacks, certain processes have been proposed, for example, in Japanese Patent Publication Nos. 11026/1970 and 49087/1980. However, these processes cannot sufficiently improve the heat resistance of disazo pigments upon coloration of polyvinyl chloride resins and the improvements to the heat resistance upon flushing are hardly satisfactory. When employed in gravure inks, a further problem arises that the souring resistance becomes poor.

SUMMARY OF THE INVENTION

An object of this invention is therefore to provide a process for the preparation of a disazo pigment having excellent heat resistance.

The present inventors have carried out an extensive research with a view toward solving the above-mentioned drawbacks of the prior art. As a result, it has been found that the use of an acetoacetanilide compound having no water-soluble groups, which contains a specific compound, as a coupling component upon preparation of a disazo pigment results in a disazo pigment free of the above-described drawbacks and moreover, the thus-obtained disazo pigment is an improved pigment even as a pigment for rubber, paints and printing inks, leading to completion of this invention.

In one aspect of this invention, there is thus provided a process for the preparation of a disazo pigment by coupling the tetrazo compound of 3,3'-dichlorobenzidine with an acetoacetanilide compound other than those represented by the below-described general formula (I), said acetoacetanilide compound being free of any water-soluble groups, wherein about 0.5–50 mole % of the acetoacetanilide compound is replaced by a compound represented by the following general formula (I):

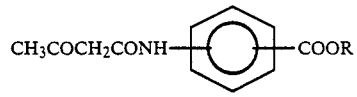

wherein R means a methyl, ethyl, propyl or butyl group or a substituted or unsubstituted phenyl group.

The disazo pigment obtained in accordance with the process of this invention is useful as a colorant for polyvinyl chloride resins. A conventional disazo pigment develops color variations even by slight changes in temperature upon heating and kneading it with a polyvinyl chloride resin. Such color variations are unavoidable even when a disazo pigment of the same lot is used. In contrast, such a drawback can be overcome when the disazo pigment of this invention is used. In addition, the disazo pigment pigment of this invention has properties improved significantly as a pigment for rubber, paints and printing inks. When the disazo pigment of this invention is used in a printing ink, the pigment is transferred from an aqueous paste of the pigment to an organic phase by a flushing method. In the case of conventional disazo pigments, growth of pigment particles takes place during this flushing operation so that their coloring power is reduced considerably. The disazo pigments of this invention however do not show such a drawback at all even when the flushing operation is conducted at a high temperature. When used in gravure inks, the disazo pigments prepared by the processes described in the above-mentioned patent publications cause viscosity increases due to the souring phenomenon, thereby resulting in insufficient transfer of the gravure inks and prints of reduced gloss. On the other hand, the disazo pigment of this invention does not develop such drawbacks and can hence provide excellent printing inks and paints.

The above and other objects, features and advantages of the present invention will become apparent from the following description of the invention and the appended claims.

DETAILED DESCRIPTION OF THE INVENTION AND PREFERRED EMBODIMENTS 3,3'-Dichlorobenzidine and the general acetoacetanilide compound containing no water-soluble groups such as carboxyl, sulfonic or hydroxyl groups, which are useful in the practice of the process of this invention, are both known. For instance, illustrative examples of the acetoacetanilide compound may include acetoacetanilide, o-chloroacetoacetanilide, p-chloroacetoacetanilide, 4-chloro-2,5-dimethoxyacetoacetanilide, 2,4-dimethoxyacetoacetanilide, o-acetoacetanisidide, o-acetoacetotoluidide, 2,4-acetoacetoxylidide, p-acetoacetanisidide, p-acetoacetotoluidide, 4-chloro-2-methylacetoacetanilide, p-ethoxyacetoacetanilide, 4-nitro-2-methylacetoacetanilide, 4-acetoacetaminophthalimide, 5-acetoacetaminobenzimidazolone, 4-benzoylamino-2,5-diethoxyacetoacetanilide and 4-acetylamino-acetoacetanilide.

In the compound represented by the general formula (I), the COOR group may be ortho, meta or para to the $CH_3COCH_2CONH$ group. The para position is however preferred. R may preferably be an ethyl or butyl group. Namely, the compound (I) may preferably be p-carboxyethyl acetoacetoanilide or p-carboxybutyl acetoacetoanilide.

The compound represented by the general formula (I) can be obtained by acetoacetylating methyl, ethyl, propyl, butyl or phenyl o-, m- or p-aminobenzoate with a diketene or an acetoacetatic ester such as ethyl acetoacetate. The phenyl group may optionally contain one or more substituent groups. The above acetoacetylation may itself be conducted under the conditions known conventionally for the preparation of acetoacetanilide.

As preferred specific examples of the compound represented by the general formula (I), the following compounds may be mentioned by way of example.

o-, m- or p-carboxymethyl acetoacetanilide;
o-, m- or p-carboxyethyl acetoacetanilide;
o-, m- or p-carboxy-n-propyl acetoacetanilide;
o-, m- or p-carboxy-iso-propyl acetoacetanilide;
o-, m- or p-carboxy-n-butyl acetoacetanilide;
o-, m- or p-carboxy-tert-butyl acetoacetanilide;
o-, m- or p-carboxy-iso-butyl acetoacetanilide;
o-, m- or p-carboxyphenylmethyl acetoacetanilide
o-, m- or p-carboxy(o-, m- or p-methylphenyl) acetoacetanilide;
o-, m- or p-carboxy(o-, m- or p-ethylphenyl) acetoacetanilide;
o-, m- or p-carboxy(o-, m- or p-nitrophenyl) acetoacetanilide; and
o-, m- or p-carboxy(o-, m- or p-chlorophenyl) acetoacetanilide.

The compound represented by the above general formula (I) is used in combination with the general acetoacetanilide compound having no water-soluble groups. Supposing that the sum of the compound represented by the general formula (I) and the general acetoacetanilide compound having no water-soluble groups is 100 moles, the compound of the general formula (I) may be used in an amount of 0.5–50 moles, preferably, 1–10 moles. Any amounts smaller than the lower limit of the former range are too little to achieve the intended advantages of the present invention. On the other hand, any amounts in excess of the upper limit of the former range are not preferred because various color fastness of the resultant disazo pigments themselves become insufficient.

The process of this invention for the preparation of the disazo pigment, in which the above-described raw materials are used, can be conducted in the same manner as the conventionally-known preparation process of disazo pigments. Namely, 3,3'-dichlorobenzidine is converted into the corresponding tetrazo compound in the manner known per se in the art, for example, at a low temperature, preferably at 5°–0° C. in the presence of ice with an inorganic acid such as hydrochloric acid and a nitrite such as sodium nitrite in water. On the side, a coupler solution is prepared in the art from a mixture of the compound of the general formula (I) and the acetoacetanilide compound by a process known per se, for example, by dissolving the mixture in water with an alkali such as caustic soda, filtering the resultant aqueous solution to remove any insoluble matter, and neutralizing the solution with an organic acid, preferably, with acetic acid to coprecipitate the compound of the general formula (I) together with the acetoacetanilide compound free of any water-soluble groups. The filtration step is however optional. The tetrazo compound and the coupler solution are then mixed by a method known per se in the art, for example, by mixing them at once and then stirring the resultant mixture or by adding a solution of the tetrazonium salt dropwise little by little to the coupler solution or the coupler solution dropwise to a solution of the tetrazonium salt and then stirring the resultant mixture for about 1 –about 10 hours, at room temperature or lower, preferably, 15° C. while maintaining the reaction mixture at pH 7.5 or lower, preferably, P 7.0 or lower with a buffer such as an aqueous solution of sodium acetate, thereby coupling them together to obtain a disazo compound having improved heat resistance. Needless to say, one or more of various water-soluble resins, a surfactant and other additives may be added during or after the coupling to treat the resultant pigment.

The present invention will hereinafter be described specifically by the following Examples and Comparative Examples, in which all designations of "part" or "parts" and "%" mean part or parts by weight and wt. % respectively unless otherwise indicated specifically.

EXAMPLE 1

52.8 parts of 3,3'-dichlorobenzidine were converted into the corresponding tetrazonium salt by a method known per se in the art, thereby obtaining an aqueous solution of the tetrazonium salt. On the side, an aqueous coupler solution was prepared by a method known per se in the art from 81.0 parts of o-acetoacetotoluidide and 4.8 parts of p-carboxyethyl acetoacetanilide. Both solutions were mixed to couple them together. The resultant pigment was filtered, washed with water, dried and then ground to obtain 138.3 parts of a disazo pigment of this invention.

One hundred parts of the above pigment were mixed with 130 parts of dioctyl phthalate to provide a colorant for polyvinyl chloride resins. One part of the colorant was added to 100 parts of a polyvinyl chloride resin compound. By using a 7-inch mixing roll (roll clearance: 0.5 mm), the thus-colored resin compound was then mixed for 5 minutes at room temperatures of 160° C. and 180° C. respectively to obtain colored sheets. The colors of the colored sheets were measured by means of a "Digital Color and Color Difference Meter, Model 01D" (manufactured by Nippon Denshoku Kogyo Kabushiki Kaisha). No substantial color difference was observed between the sheet processed at 160° C. and that processed at 180° C. ($\Delta E = 0.3$).

For the sake of comparison, a similar test was conducted by using Pigment Yellow 14 (a disazo pigment synthesized from 3,3'-dichlorobenzidine and o-acetoacetotoluidide) in lieu of the above pigment of this invention. In this test, $\Delta$ was 3.2 and a significant color difference was observed.

EXAMPLE 2

Similar to Example 1, a disazo pigment having good heat resistance ($\Delta E = 0.6$) was obtained in the same manner as in Example 1 except that 81.0 parts of p-acetoacetotoluidide were employed instead of o-acetoacetotoluidide.

Incidentally, $\Delta E$ was 4.3 in the case of Pigment Yellow 55 (a disazo pigment synthesized from 3,3'-dichlorobenzidine and p-acetoacetotoluidide).

EXAMPLE 3

Similar to Example 1, a disazo pigment having good heat resistance ($\Delta E = 0.4$) was obtained in the same manner as in Example 1 except that 5.1 parts of p-carboxybutyl acetoacetanilide were used instead of p-carboxyethyl acetoacetanilide.

EXAMPLE 4

35.2 parts of 3,3'-dichlorobenzidine were converted into the corresponding tetrazonium salt by a method known per se in the art, thereby obtaining an aqueous solution of the tetrazonium salt. On the side, an aqueous coupler solution was prepared by a method known per se in the art from 49.4 parts of acetoacetanilide and 3.8 parts of p-carboxyethyl acetoacetanilide. Both solutions were mixed to couple them together. The resultant pigment was filtered and then washed with water, thereby obtaining a wet press cake having a solid content of 88.4 parts.

The coloring power and heat resistance of an offset ink prepared by using the thus-obtained pigment were compared with conventionally-known pigments of the same sort. Results are shown in Table 1.

TABLE 1

| | Coloring power | Heat resistance |
| --- | --- | --- |
| Pigment of Ex. 4 | 100 | Unchanged. |
| Known Pigment 1 | 60 | Clarity was lost so much that the pigment was no longer actually usable. |
| Known Pigment 2 | 90 | Clarity was lost, thereby making the pigment somewhat unclear. |

In Table 1, Known Pigment 1 is untreated Pigment Yellow 12 while Known Pigment 2 is a pigment obtained in the same manner as in Example 4 except for the use of 3.4 parts of 2-acetoacetoaminobenzoic acid instead of p-carboxyethyl acetoacetanilide (see, for example, Japanese Patent Publication No. 49087/1980).

Their performance was evaluated in the following manner. Namely, their heat resistance was each evaluated by adding a wet press cake, which contained 80.0 parts of the corresponding pigment, to 300 parts of an offset ink varnish. The resultant mixture was mixed and kneaded in a flusher to remove water separated in the first stage. Flushing was continued while mixing and kneading the mixture at a temperature below 60° C. After removal of water separated in the second stage, 420 parts of the varnish were added and mixed further to obtain an offset ink. The offset ink was spread over a sheet of black art paper. The sheet of black art paper was then subjected to a heat treatment at 200° C. for 60 seconds. Changes, for example, in coloring power, clarity and the like were then observed to evaluate the heat resistance of the pigment. The coloring power of each of the pigments was judged by thinning the corresponding offset ink with titanium white ink. The following thinning ratios were employed.

One part of the ink of Example 4 was thinned with 14 parts of the white ink.

One part of the ink prepared by using Known Pigment 1 was thinned with 10 parts of the white ink.

One part of the ink prepared by using Known Pigment 2 was thinned with 13 parts of the white ink.

EXAMPLE 5

Charged in a vessel were 10 parts of the pigment obtained in Example 1, 58 parts of a polyamide-base varnish, 17 parts of a nitrocellulose-base varnish and 15 parts of a solvent, together with steel balls. The resultant mixture was dispersed with a paint conditioner to prepare 100 parts of a gravure ink. One part of water was then added to 100 parts of the thus-obtained gravure ink. After mixing the resultant mixture in a paint conditioner, its viscosity was measured. It was found to be 2.0 poises. The viscosity increased to 3.0 poises after the ink was maintained at 50° C. for 120 hours. A similar test was also conducted with respect to a pigment obtained in the same manner as in Example 1 except that 4.3 parts of 2-acetoacetoaminobenzoic acid were used in place of p-carboxyethyl acetoacetanilide (see, for example, Japanese Patent Publication No. 49087/1980). The viscosity jumped from 2.2 poises to 12.0 poises, thereby causing inconvenience upon actual use of the resultant ink.

The viscosities were measured by a BL-type viscometer (manufactured by Tokyo Keiki Co., Ltd.).

EXAMPLES 6–15

Disazo pigments of this invention were separately obtained in the same manner as in Example 1 except that the below-listed compounds were used in their corresponding amounts in place of the compound of the general formula (I) in Example 1. In addition, a polyvinyl chloride resin was separately colored with the thus-obtained disazo pigments in the same manner as in Example 1. Following the procedure of Example 1, the color difference were measured. Results are summarized in Table 2.

TABLE 2

| Ex. No. | Compound of general formula (I) (identified by the COOR group) | | Color difference (ΔE) |
| --- | --- | --- | --- |
| 6 | —COOCH$_3$ | (6 mole %) | 0.2 |
| 7 | o-COOC$_2$H$_5$ | (16 mole %) | 0.1 |
| 8 | p-COO—n-C$_3$H$_7$ | (3 mole %) | 0.3 |
| 9 | m-COO—iso-C$_3$H$_7$ | (24 mole %) | 0.1 |
| 10 | p-COO—tert-C$_4$H$_9$ | (0.6 mole %) | 0.8 |
| 11 | o-COO—n-C$_4$H$_9$ | (11 mole %) | 0.2 |
| 12 | p-COOC$_6$H$_5$ | (5 mole %) | 0.3 |
| 13 | m-COO(p-CH$_3$—C$_6$H$_4$) | (3 mole %) | 0.5 |
| 14 | m-COO(m-NO$_2$—C$_6$H$_4$) | (27 mole %) | 0.1 |
| 15 | m-COO(o-Cl—C$_6$H$_4$) | (40 mole %) | 0.1 |

Note:
The mole % in each paired parentheses indicates the proportion of the corresponding compound of the general formula (I) employed, relative to the sum of the compound of the general formula (I) and o-acetoacetotoluidide.

Having now fully described the invention, it will be apparent to one of ordinary skill in the art that many changes and modifications can be made thereto without departing from the spirit or scope of the invention as set forth herein.

We claim:

1. A disazo pigment which is produced by coupling a tetrazo compound of 3,3'-dichlorobenzidine with (a) an acetoacetanilide compound other than those represented by the formula I, said acetoacetanilide compound being free of any water-soluble groups, and (b) about 0.5–50 mole % of an acetoacetanilide compound, based on the total amount of the acetoacetanilide compounds, having the formula I:

(I)

wherein R is a C$_1$–C$_4$ alkyl, phenyl or phenyl which is substituted by methyl, ethyl nitro or chloro.

2. The disazo pigment as claimed in claim 1, wherein the acetoacetanilide compound being free of any water-soluble groups is selected from the group consisting of acetoacetanilide, o-chloroacetoacetanilide, p-chloroacetoacetanilide, 4-chloro-2,5-dimethoxyacetoacetanilide, 2,4- dimethoxyacetoacetanilide, o-acetoacetanisidide, o-acetoacetotoluidide, 2,4-acetoacetoxylidide, p-acetoacetanisidide, p-acetoacetotoluidde, 4-chloro-2-methyl-acetoacetanilide, p-ethoxyacetoacetanilide, 4nitro-2-methylacetoacetanilide, 4- acetoacetaminiphtalimide, 5-acetoacetaminobenzimidazolone, 4-benzoylamino-2,5-diethoxyacetoacetanilide and 4-acetylaminoacetoacetanilide.

3. The disazo pigment as claimed in claim 2, wherein the acetoacetanilide compound is o-acetoacetotoluidide or p-acetoacetotoluidide.

4. The disazo pigment as claimed in claim 1, wherein the COOR group is para to the CH$_3$COCH$_2$CONH group in the general formula (I).

5. The disazo pigment as claimed in claim 1, wherein R is an ethyl or butyl group in the formula (I).

6. The disazo pigment as claimed in claim 1, wherein the compound represented by the formula (I) is p-carboxyethyl acetoacetoanilide or p-carboxybutyl acetoacetoanilide.

7. The disazo pigment as claimed in claim 1, wherein 1-50 mole % of the acetoacetanilide compound is replaced by the compound represented by the formula (I).

8. The disazo pigment as claimed in claim 7, wherein 3-23 mole % of the acetoacetanilide compound is replaced by the compound represented by the formula (I).

9. The disazo pigment as claimed in claim 1, wherein 3,3'-dichlorobenzidine is converted to its tetrazo compound with an inorganic acid and a nitrite at a low temperature in water.

10. The disazo pigment as claimed in claim 9, wherein the inorganic acid and nitrite are hydrochloric acid and sodium nitrite respectively and the conversion has been effected at 5°-0° C. in the presence of ice.

11. The disazo pigment as claimed in claim 1, wherein prior to the coupling of the tetrazo compound, the compound of the formula (I) and the acetoacetanilide compound are converted into a coupler solution by dissolving the compound of the formula (I) and the acetoacetanilide compound in water with an alkali, followed by neutralization with an organic acid to coprecipitate the compound of the formula (I) together with the acetoacetanilide compound.

12. The disazo pigment as claimed in claim 11, wherein a filtration step is included before the neutralization step so as to remove any insoluble matter.

13. The disazo pigment as claimed in claim 11, wherein the alkali and organic acid are caustic soda and acetic acid respectively.

14. The disazo pigment as claimed in claim 11, wherein the coupling of the tetrazo compound is effected by adding an aqueous solution of the tetrazo compound dropwise to the coupler solution.

15. The disazo pigment as claimed in claim 11, wherein the coupling of the tetrazo compound is effected by adding the coupler solution dropwise to an aqueous solution of the tetrazo compound.

16. The disazo pigment as claimed in claim 1, wherein about 1-10 mole % of the acetoanilide compound which is free of any water-soluble groups is replaced by said acetoacetanilide compound of the formula I.

* * * * *